(12) United States Patent
Heap

(10) Patent No.: US 10,280,564 B2
(45) Date of Patent: May 7, 2019

(54) CUTTING MACHINE

(71) Applicant: Brett Heap, Las Vegas, NV (US)

(72) Inventor: Brett Heap, Las Vegas, NV (US)

(73) Assignee: Opensoft, Inc., Las Vegas, NV (US)

( * ) Notice: Subject to any disclaimer, the term of this patent is extended or adjusted under 35 U.S.C. 154(b) by 462 days.

(21) Appl. No.: 14/856,437

(22) Filed: Sep. 16, 2015

(65) Prior Publication Data

US 2016/0090695 A1 Mar. 31, 2016

Related U.S. Application Data

(60) Provisional application No. 62/056,170, filed on Sep. 26, 2014.

(51) Int. Cl.
| | |
|---|---|
| *D21G 9/00* | (2006.01) |
| *B26D 5/00* | (2006.01) |
| *G05B 19/18* | (2006.01) |
| *B26D 7/01* | (2006.01) |
| *B26D 1/08* | (2006.01) |
| *B26D 5/20* | (2006.01) |
| *B26D 5/42* | (2006.01) |
| *B26D 7/02* | (2006.01) |
| *B26D 5/10* | (2006.01) |

(52) U.S. Cl.
CPC .......... *D21G 9/0009* (2013.01); *B26D 5/007* (2013.01); *B26D 7/016* (2013.01); *G05B 19/182* (2013.01); *B26D 1/08* (2013.01); *B26D 5/10* (2013.01); *B26D 5/20* (2013.01); *B26D 5/42* (2013.01); *B26D 7/025* (2013.01); *G05B 2219/33301* (2013.01)

(58) Field of Classification Search
CPC ........ D21G 9/0009; B26D 7/016; B26D 1/08; B26D 5/10; B26D 7/025; B26D 5/42; B26D 5/20; G05B 19/182
See application file for complete search history.

(56) References Cited

U.S. PATENT DOCUMENTS

| | | | |
|---|---|---|---|
| 2,095,309 A * | 10/1937 | Brackett | ................ B26D 7/016 83/239 |
| 2,649,153 A | 8/1953 | Barley | |
| 3,754,492 A | 8/1973 | Krauss | |

(Continued)

FOREIGN PATENT DOCUMENTS

| | | |
|---|---|---|
| EP | 0391435 A1 | 10/1990 |
| EP | 0972618 A1 | 7/1999 |

(Continued)

*Primary Examiner* — William Coleman
(74) *Attorney, Agent, or Firm* — Fish IP Law, LLP

(57) ABSTRACT

A guidance system provides step-wise, real-time or near real-time video guidance to a cutting machine operator to efficiently cut up a lift into multiple products, where determining an efficient sequence of steps is laborious for an ordinary operator. The display can advantageously show the operator where to temporarily store various "logs" that are cut off from the lift, and how and when to reinsert them into the cutting machine for further cuts, whether by themselves, in side-by-side manner, and/or in stacks. Camera feedback can be used to ensure that the operator is properly positioning and orienting the lift/logs. The display can alternatively or additionally use simulation to guide the operator.

25 Claims, 8 Drawing Sheets

(56) References Cited

U.S. PATENT DOCUMENTS

| | | | | |
|---|---|---|---|---|
| 4,331,050 A | * | 5/1982 | Gergek | B23D 15/06 |
| | | | | 83/468 |
| 4,757,731 A | | 7/1988 | Mohr | |
| 5,131,301 A | * | 7/1992 | Gergek | B26D 7/015 |
| | | | | 83/13 |
| 5,241,483 A | * | 8/1993 | Porret | B26D 5/007 |
| | | | | 101/484 |
| 6,640,682 B2 | * | 11/2003 | Wagner | B23D 25/02 |
| | | | | 83/289 |
| 7,792,602 B2 | * | 9/2010 | Dick | B23D 59/008 |
| | | | | 144/356 |
| 7,852,498 B2 | * | 12/2010 | Ohashi | G06F 3/1211 |
| | | | | 358/1.1 |
| 8,219,236 B2 | * | 7/2012 | Moisio | D21G 9/0009 |
| | | | | 162/194 |
| D701,253 S | * | 3/2014 | Thoma | D15/127 |
| 9,061,435 B1 | | 6/2015 | Proudfoot et al. | |

FOREIGN PATENT DOCUMENTS

| | | |
|---|---|---|
| EP | 2123412 A1 | 5/2008 |
| EP | 2687975 | 1/2014 |
| GB | 1009377 | 11/1965 |
| JP | 3-19794 A | 1/1991 |
| JP | 2000-94392 A | 4/2004 |
| JP | 2013-111658 A | 6/2013 |

* cited by examiner

CUTTING MACHINE

This application claims priority to U.S. Provisional Patent Application 62/056,170, filed Sep. 26, 2014. All extrinsic materials identified herein are incorporated by reference in their entirety.

FIELD OF THE INVENTION

The field of the invention is apparatuses, methods, and systems for cutting stacks of paper and other sheet materials.

BACKGROUND

The background description includes information that can be useful in understanding the present invention. It is not an admission that any of the information provided herein is prior art or relevant to the presently claimed invention, or that any publication specifically or implicitly referenced is prior art.

To make affordable printed materials available to consumers quickly, business cards, postcards, and other cards are often printed together on large sheets (e.g., paper or cardstock) for printing efficiency. Sheets might well be almost 4 ft by 3 ft, containing dozens of individual cards that must be cut apart. Typical large format print sheets include A0, A1, A2, A3, A4, B1 and B2. The printed sheets are stacked or piled into lifts, which are loaded into a cutting machine. As used herein, the term "lift" refers to any stack of uncut printed sheets that is cut (or re-cut) by the cutting machine. The printed sheets that comprise the lift can be loaded directly into the cutting machine or into a jogger. When the printed sheets are first loaded into a jogger, the jogger aligns the printed sheets, typically into a rectangular cube. The lift can then be transferred to the cutting machine. A single run may comprise 100, 200, 250, 300, 400, 500, 1000 or more printed sheets. When a run exceeds the capacity of the cutting machine, the run is divided into multiple lifts. Typically, each lift in the run has a uniform quantity of printed sheets. For example, a run of 1000 sheets can be divided into four lifts of 250 sheets.

Because the various cards or other pieces to be cut apart can have different sizes and orientations, making appropriate cuts in an efficient manner can be extraordinarily difficult, typically requiring a skilled operator to invest 1-1.5 hours calculating which cuts to make, and where the backgauge should be located with respect to the various cuts.

One solution is to limit printing of the large sheets to a relatively small number of known formats, perhaps 10 to 15 such formats. Operators could then have pre-established protocols for cutting apart the sheets of each of the formats. That solution is suboptimal, however, because the limited number of formats restricts the layouts that can be used, and experience has shown that such limitation often wastes a significant portion of the sheets.

U.S. Pat. No. 3,754,492 to Krauss (filed Oct. 7, 1971) discloses a sheet cutting apparatus having a horizontal bed for supporting a stack of sheet material, such as paper sheets, means for supporting a cutting blade for movement in a vertical plane, hydraulically operated means for urging said cutting blade downwardly toward said bed, hydraulically operated clamp means for clamping said sheet material in position on said bed, and means for causing said hydraulic clamping means to become operative prior to the operation of said cutting blade, which include two spaced apart controls adapted to be manually operated. These controls must be simultaneously actuated to initiate operation of the clamp and blade. However, this sheet cutting apparatus still requires a skilled operator to determine the sequence of cuts and to make time-consuming adjustments to the vertical plane.

European Patent Application EP 2,687,975 to Gottschalk (filed Jul. 19, 2012) discloses a method for processing a printed sheet in a machine. The method involves supplying data relevant to the print image of the sheet, to an internal storage memory of a cutting machine and/or an external storage memory. After the printed sheet is loaded in the machine, the actual print image is detected by an image processing system. The detected print image is compared with the stored print image. The processing data for the printed sheet is loaded in the assigned working memory of the machine. However, this method fails to instruct the operator how to load the lift and logs against the backgauge of the cutting machine for each successive cut.

Thus, there is still a need for apparatus, systems and methods that provides step-wise, real-time or near real-time guidance to a cutting machine operator to efficiently cut a lift into multiple products.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that can be useful in understanding the present invention. It is not an admission that any of the information provided herein is prior art or relevant to the presently claimed invention, or that any publication specifically or implicitly referenced is prior art.

In some embodiments, the numbers expressing quantities of sheets of paper, paper dimensions, the thicknesses of stacks of paper and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention can contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

The inventive subject matter provides apparatus, systems and methods in which a computer provides step-wise, real-time or near real-time video guidance to a cutting machine operator to efficiently cut a lift into multiple products, where determining an efficient sequence of steps is laborious for an ordinary operator.

Preferred cutting machines comprise a table, a backgauge, a cutting blade or other cutter, a press member configured to press the lift against the table while the lift is being cut by the blade/cutter, and a control module that operates an actuator that positions the backgauge with respect to the blade/cutter for successive cuts, and a display that provide instructions to the operator. As used herein, the term "backgauge" means a wall or other "stop" against which an actuator pushes a lift. Backgauges need not be located at the back of a work table or workspace, or parallel to an operating blade, or even perpendicular to the work table.

It is contemplated that cutting will be performed according to a cut course, cutting program, or other pattern. A "cut course" is the series of cuts, or blade drops, made by the cutting machine to cut each lift in a run into finished products. Cut courses include cuts made to trim the edges off the lift(s), cuts that form the edges of finished products, and backtrim (cuts that trim away rough edges and/or scraps, smoothing the edges of the finished products). Some automated cutting machines feature "built-in" control systems that typically store cut courses having a maximum of 99 cutting steps. However, cut courses, particularly those that involve multiple lifts, can easily exceed 99 cutting steps. To overcome this limitation, exemplary control systems may be configured to create cut courses having more than 99 cutting steps and to integrate with the built-in control system. In further exemplary embodiments of the inventive subject matter, it may be desirable to load the cut course to the cutting machine one step at a time or in small groups of steps. Therefore, cutting machines according to the inventive subject matter may further comprise an interface configured to receive information about the cut course via a software as a service portal.

In further aspects, the cutting machine further comprises a processor configured to generate the cut course. The processor generates cut courses on demand. It should be appreciated that the processor can be local (on-site, connected via hardware or a LAN), distal (off-site, connected via a WAN), or semi-local (the processor components are divided between on-site and off-site locations) to the control module of the cutting machine. The inventors contemplate processors that generate (or modify) cut courses to account for: the number of printed sheets in a run, cutting blade length (or maximum cut length for other cutters), packaging preferences (e.g., such that products to be packaged together are finished at the same time), paper/cardstock coatings, changes to the dimensions of the printed sheet before cutting (e.g., stretching, shrinkage, variations in thickness over the surface of the sheet), and the frictional properties of the printed sheet.

In especially preferred embodiments, a display also shows the operator where to temporarily store various "logs" that are cut off of the lift(s), and how and when to reinsert them into the cutting machine for further cuts. As used herein, the term "log" means a stack of paper/sheet material that results from cutting the lift and may refer to the portion of the lift that remains after each successive log is removed. To clarify, if a log is cut further, then it is both a log and a lift. If the log is not cut further, then it is a finished product. The display can advantageously depict reinserting logs in side-by-side manner, and/or in stacks. The cutting blade/cutter then cuts the side-by-side/stacked logs concurrently.

As used herein the term "concurrent cut" with respect to multiple logs means a movement of a blade that makes cuts in each of the multiple logs with a single motion of the blade, and without repositioning of the logs. Under this definition, for example, a stack or side-by-side arrangement of two logs can be concurrently cut with a single motion of the blade, even though the logs are cut at least partially in sequence.

For example, in a run of 1000 printed sheets processed in lifts of 250 printed sheets. Each lift is cut into logs containing uniform products, then set aside on a "logs desk" until all four lifts are cut into logs. Next, the logs having the same product (or similarly sized products) from each of the four lifts are reinserted into the cutter to be cut in the direction perpendicular to the original cuts. The finished products are then placed on a "finished products desk" to await packaging. The control module can optionally instruct the operator to package the finished products. In some cases, the control module instructs the operator to package the products immediately after they are finished (i.e., without first storing the finished products on the finished products desk).

In some embodiments a camera can be used to capture live images and/or video of the lift, which can then be displayed in context to the operator, to help ensure that the operator is positioning and orienting the lift with respect to the cutting blade/cutter and/or the backgauge. In other embodiments a simulation of the lift can be used in place of, or in addition to, the image. In still other embodiments, a sensor can be used in place of the camera. When desirable, the processor can be further configured to use the live images and/or video to dynamically modify the cut course to increase the accuracy of each cut. The capability to dynamically modify the cut course can be particularly advantageous when it is difficult to accurately model the dimensional changes to the printed sheets from fluctuations in humidity, printing, and other processing steps that occur before cutting. For example, a cut course may not initially account for deviations of the printed sheet from the JDF file including: stretching, shrinkage, variations in thickness over the surface of the sheet, and frictional properties.

In further aspects of the inventive subject matter, the control module is further configured to control other functionalities of the cutting machine, such as: table angle, table air, pile push-out, and/or press member pressure. For example, the number of printed sheets per lift and press member pressure can be optimized to maximize quality, e.g., by decreasing the number of printed sheets per lift and increasing press member pressure. Additionally, the control module can be configured to control one or more actuators to actuate a side wall, remove a scrap, and/or tilt the backgauge.

In yet further aspects of the inventive subject matter, the control module can be further configured to integrate with a management information system (MIS). The MIS can be local, semi-local, or distal/remote. A typical MIS can store information about customers, jobs, cutting machines, operators, and other data.

The inventors contemplate adapting automated cutting machines with built-in control systems that control various parts of the cutting machine, such as the actuators, backgauge, cutting blade/cutter, table air, and/or press member by integrating the control module with the built-in control systems. In one embodiment, such integration can be achieved by inserting a command signal in a signal path of the built-in control system.

It should be appreciated that the control module is further configured to make service recommendations. For example, after a specified number of blade drops, the operator can be instructed to have the cutting blade/cutter serviced or replaced.

From a method perspective, the inventive subject matter includes instructing an operator to use a cutting machine to cut a lift into a set of products by providing simulations that depict: (a) how to orient the lift to make successive cuts to produce cut-away logs; (b) how to move the cut-away logs to specified relative positions and orientations in a holding area; (c) real-time or near real-time positioning of the lift and/or cut-away logs with respect to the cutting machine and/or holding area(s). As used herein, the term "real-time" means the operational deadline from event to system response is on the order of micro, milliseconds, or even seconds. "Near real-time" refers to operational deadlines that are slightly slower than real-time, e.g., from 30 s to several minutes.

The display can advantageously also instruct the operator in reinserting cut-away logs into the cutting machine, in side-by-side or stacked arrangements for concurrent cutting. Other exemplary methods further comprise providing feedback to the operator with respect to whether the operator is properly operating the cutting machine in accordance the simulation(s). Optionally, the method can include providing a packaging recommendation to the operator or a packager for each set of products.

Various objects, features, aspects and advantages of the inventive subject matter will become more apparent from the following detailed description of preferred embodiments, along with the accompanying drawing figures in which like numerals represent like components.

DETAILED DESCRIPTION

The inventive subject matter provides apparatuses, systems, and methods that improve the efficiency of cutting printed sheets into products. The improved efficiency is achieved by providing step-wise, real-time or near real-time video guidance to a cutting machine operator. Advantageously, the video guidance displayed to the operator employs cut courses that improve the accuracy of each cut by accounting for factors including the number of printed sheets in each run, and dimensional changes to the printed sheets from printing/processing, and humidity. Additionally, contemplated cutting machines feature a superior ability to obtain, generate, modify, and/or store cut courses.

Figure 1:
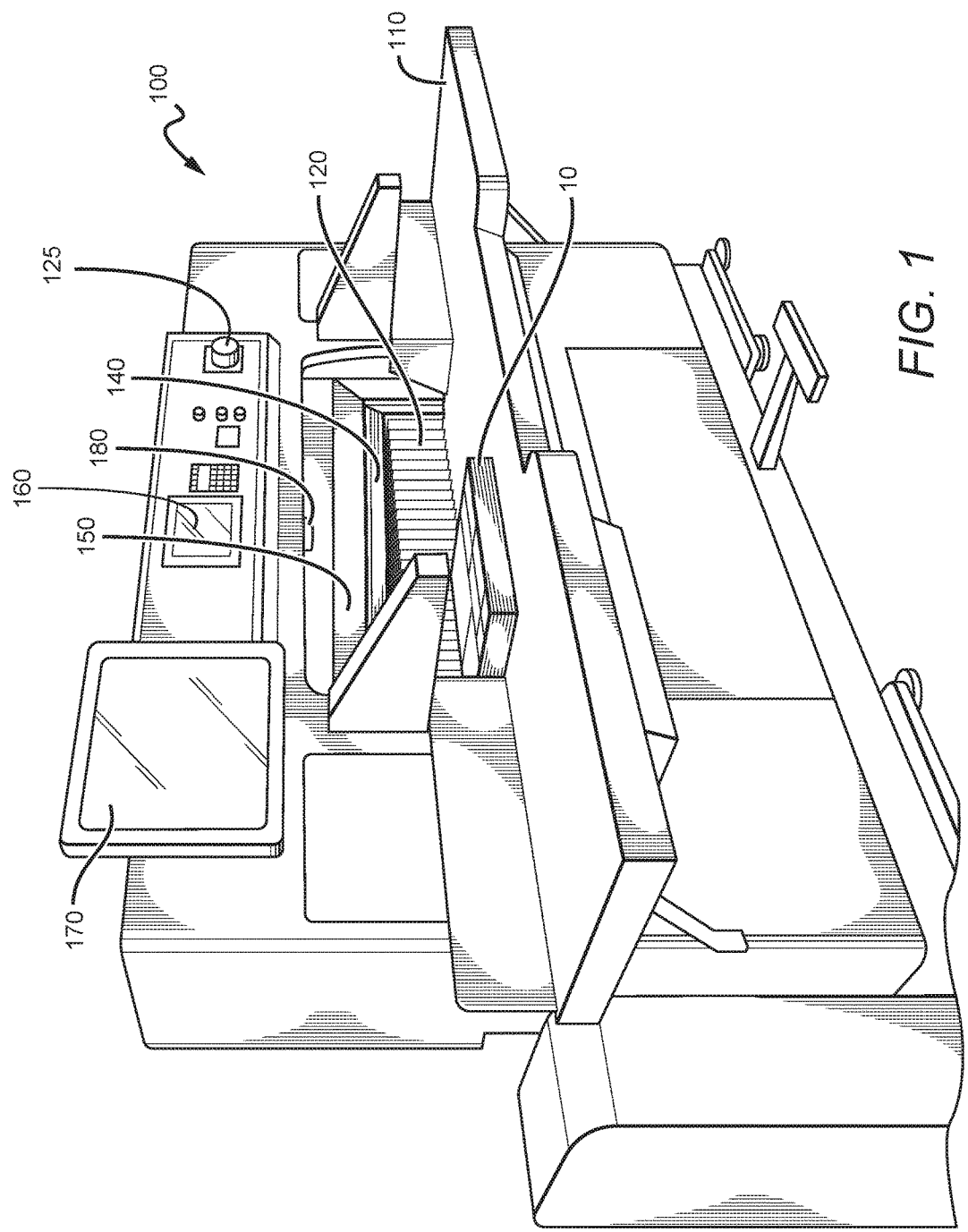
FIG. 1 is a perspective view of cutting machine 100.

FIG. 1 generally depicts a cutting machine 100 having table 110, backgauge 120, cutting blade 140, press member 150, control module 160, actuator 125, which positions backgauge 120 with respect to the blade for successive cuts, and display 170 that provides instructions to the operator.

Table 110 generally has a flat work surface; however, in contemplated embodiments the table could have a curved or other three dimensional work surface. In FIG. 1, the work surface is horizontal, but could be at angle off horizontal, or positioned vertically. Typically, the table has air holes through which flowing air acts as a lubricant, facilitating movement of lifts and logs along the work surface of the table.

Backgauge 120 generally has a grooved surface that comes in contact with the lift. The grooved surface can comprise a single piece, or more preferably multiple adjacent or otherwise juxtaposed slats. Since the lift might well comprise a stack of uncoupled sheets, it is advantageous for the height of the backgauge to be equal to or greater than the height of the lift.

Actuator 125 can be pneumatic, hydraulic, electric, or deployed by other mechanical means. All suitable actuator structures are contemplated, including for example a plunger/tube apparatus, a lead screw (or other screw-type apparatus), or a servo.

Cutting blade 140 has a beveled cutting edge, with a flat side and an opposing curved side. Un-beveled and serrated cutting blades are also contemplated. The cutting blade can be configured to be operated manually, pneumatically, hydraulically, robotically, or by other mechanical means. Alternative contemplated cutters include a straight cutter, a guillotine cutter, a rotary cutter (cutting wheel), and a laser.

Press member 150 is configured to press the lift against the table while the lift is being cut by the blade. In preferred embodiments, the press member will be a hydraulically or pneumatically powered slide; however the press member can also be a ram, plunger, platen, or other apparatus capable of immobilizing the lift during cutting.

Control module 160 is an electronic component or set of components that controls the backgauge, the press member, and the cutting blade. One skilled in the art appreciates that the control module can be further configured to accept real-time or near real-time images (and/or video) feed from camera 180, which is focused on the lift. Control module 160 can then process the images/video for transmission to display 170. Optionally, images from camera 180 can be compared with an image file of the printed sheet for the job being cut to verify that the lift/logs on the cutting machine match the job programmed into the cutting machine. Next, display 170 can show the operator how at least a portion of an image of the lift is positioned with respect to the backgauge and/or the cutting blade (or other cutter). It should be appreciated that such displays allow the operator to compare images of how the lift/logs are supposed to be positioned with images of how they actually are positioned, and thus to detect errors in the placement of the lift/logs. Inspection of the lift/logs for correct orientation (e.g., position and rotation) can be automated. Sensors (or a one-dimensional optical array) can be used in lieu of or in addition to video cameras in such inspection functions.

In addition to inspecting for correct orientation, camera 180 can be used to verify that cuts are being made in the intended location(s) on the lift/logs. For example, camera 180 can be focused on a part of the lift where a cut is expected to be found, and any displacement of the cut can be detected. Images/sensor data can further be used to determine whether the position of the backplane requires adjustment, and if so, the backplane can be automatically adjusted.

In especially preferred embodiments, display 170 also shows the operator where to temporarily store various logs that are cut off from the lift (e.g., on a logs desk or a finished products desk), and how and when to reinsert them into the cutting machine for further cuts. The display can advantageously depict reinserting logs in side-by-side manner, and/ or in stacks.

Figure 2:
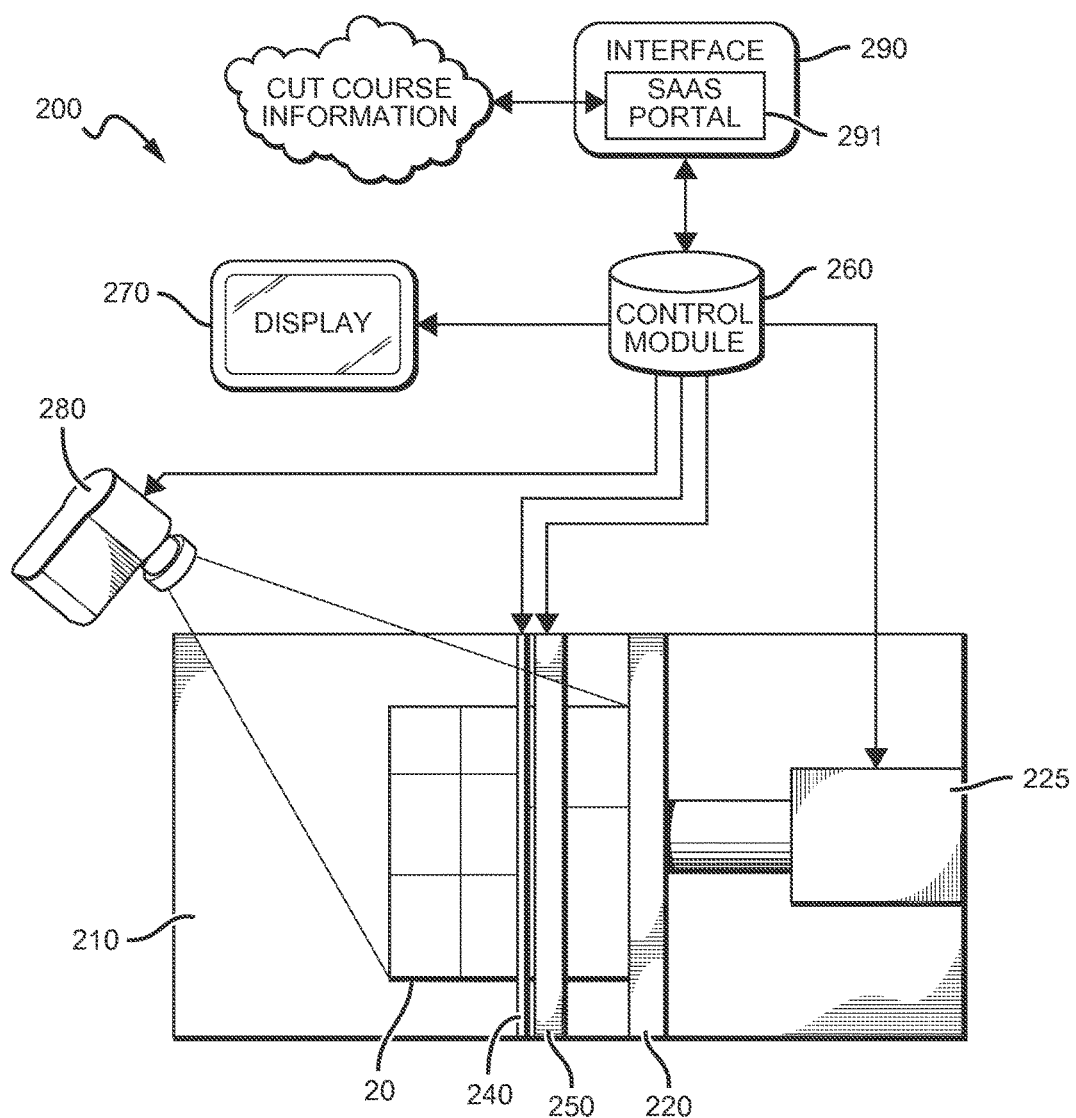
FIG. 2 is a schematic representation of a top view of cutting machine 200, which has an interface 290 for receiving cut course information via an SAAS portal 291.

In further aspects of the cutting machine, an interface 290 can be configured to receive information about the cut course via a software as a service (SAAS) portal 291, as shown in FIG. 2. An advantage of transmitting cut course information using SAAS is that many more cut courses can be sent to the controller and cutting machine than when the cut courses must be stored in local memory, although storing cut courses in local memory is not excluded. Another advantage of linking control module 260 to a SAAS portal is that cut courses can be generated in cloud-based servers. This configuration reduces installation, maintenance, and IT costs for the client, and takes the burden of updating/ upgrading software off of the client.

Cut course information can also be gathered from other systems, for example the number of printed sheets in a run and the dimensions of the final products can be harvested from prepress imposition software. This allows the number of lifts and other parameters to be determined using the SAAS, without having to manually input run parameters.

Contemplated cut courses can also integrate various failure recovery operations. For example, if a cut course calls for backgauge 220 to be sent out of its range of motion, control module 260 can detect the error and request a modification to the cut course via SAAS portal 291 or interface 290. Likewise, a step of "re-homing" the backgauge can be performed when the backgauge overshoots an in-range position command. Additionally, a power outage can be detected and machine/control parameters can be saved, so that when power is restored, recovery is seamless.

Figure 3:
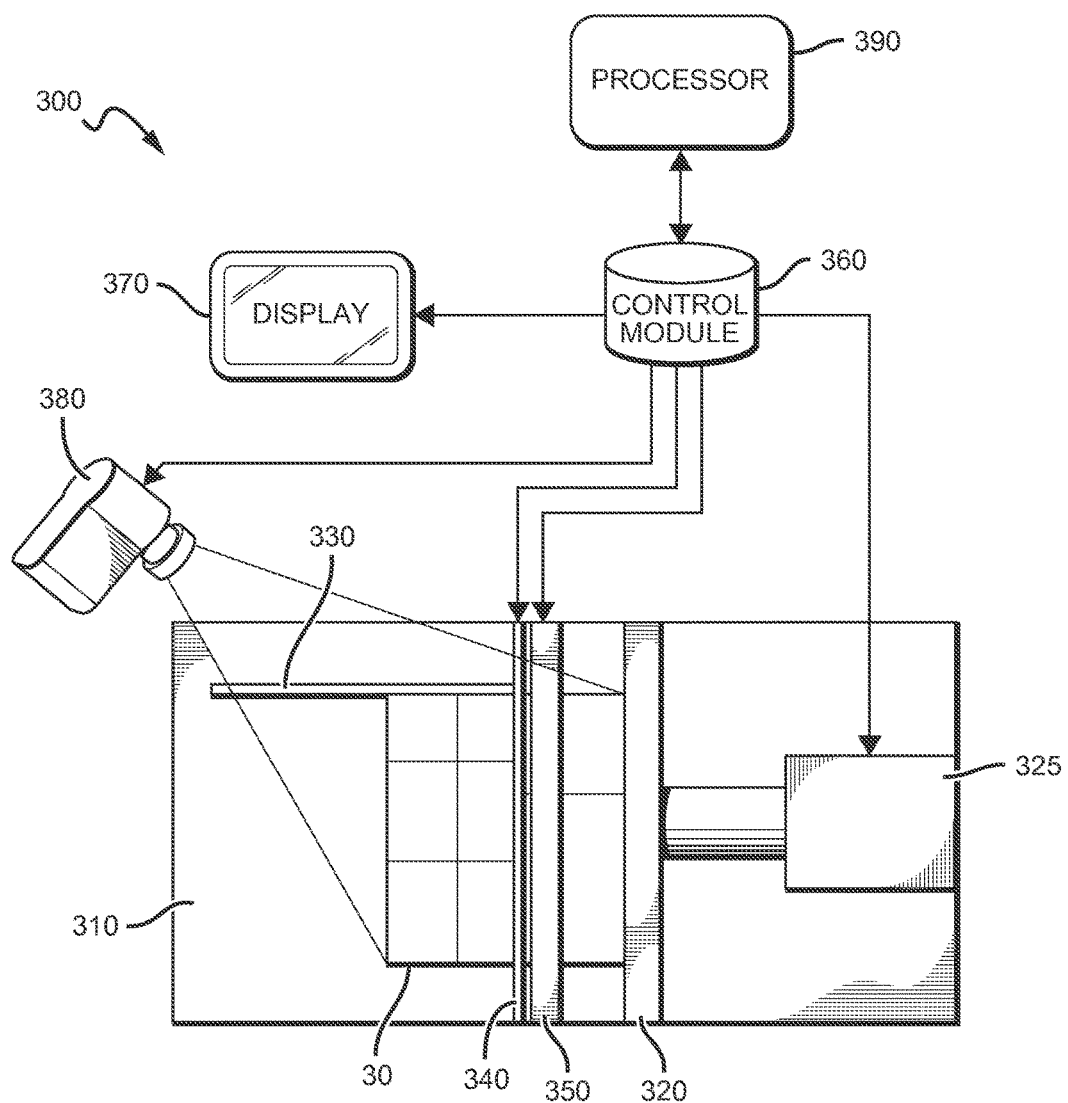
FIG. 3 is a schematic representation of a top view of cutting machine 300, which has a processor 390 for generating/modifying cut courses.

As briefly discussed above, if humidity is poorly controlled, the printing process can stretch and shrink the printed sheets, resulting in sheets that deviate from the JDF/cut course files and may vary in thickness across the length and width of each printed sheet. To ensure the accuracy of cuts in these circumstances, processor 390 can be added to cutting machine 300 as shown in FIG. 3. Processor 390 is coupled to control module 360 and can use images, video, and/or sensor data to detect deviations of the printed sheets from the electronic files (e.g., JDF, cut course files) to adjust the position of backgauge 320 and/or the cut course to increase the accuracy of each cut. When changes to the print sheet are uniform across the sheet, the change can be fit to a model and compensated for in the cut course. For example, stretching, which increases the length of the printed sheet can be fit to a linear model, and the cut course can then be designed using the model.

In runs that require multiple lifts to be cut, the operator typically visually aligns the first two cuts to the lift. While the first two cuts can be programmed into some automated machines, it has not been appreciated that the first two cuts can be programmed automatically. Thus, the inventors contemplate that processor 390 and/or control module 360 can automatically propagate the first two cuts into the cut course for the remaining lifts in a run.

Figure 4:
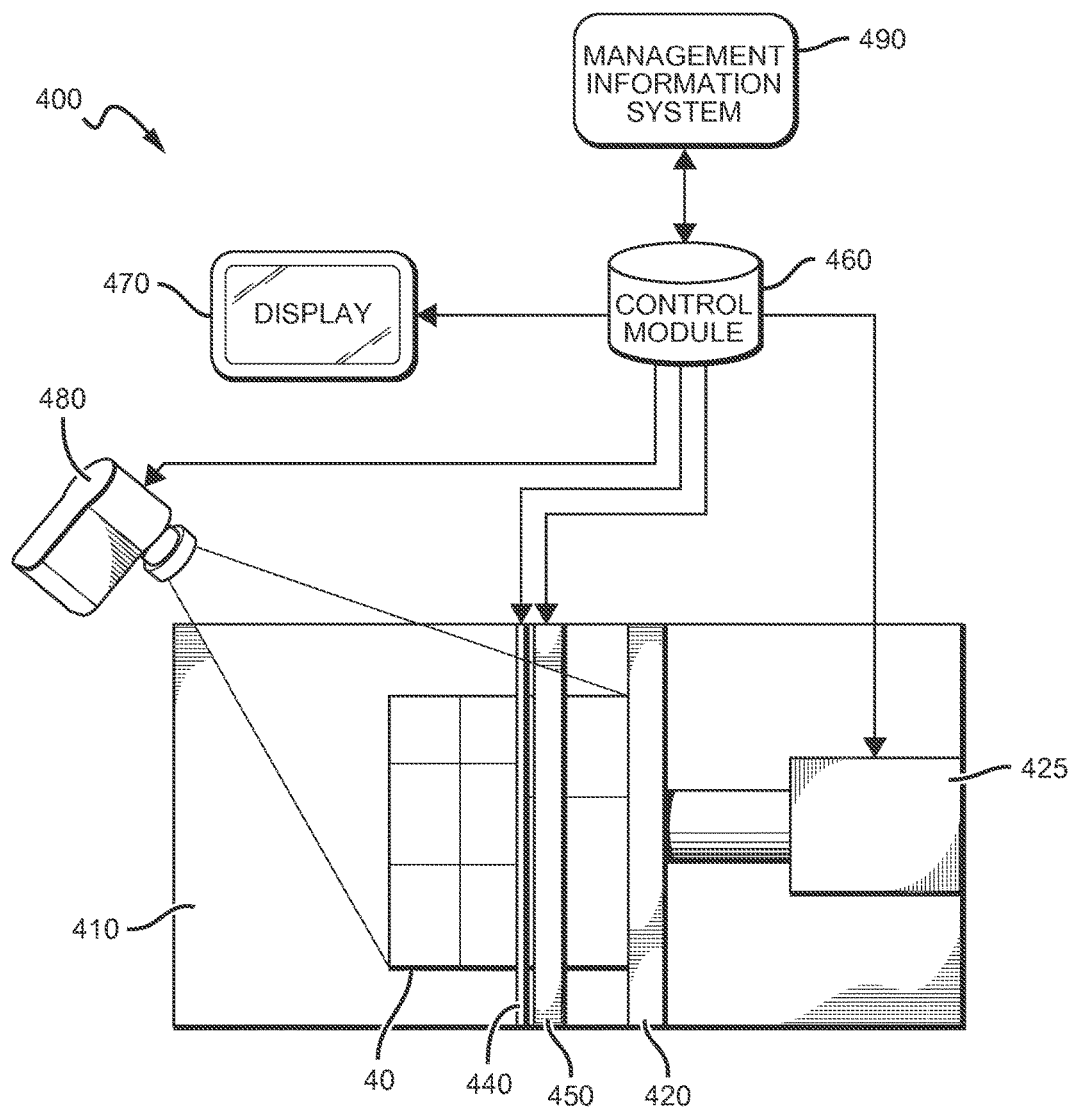
FIG. 4 is a schematic representation of a top view of cutting machine 400 in which the control module 460 is integrated with a management information system 490.

In regard to FIG. 4, it should be appreciated that control module can be coupled with management information system (MIS) 490. MIS 490 can store data about clients/ customers, jobs, operators, and/or cutting machines. Such data can include customer preferences, common orders, deadlines, quality specifications, supplier information, packaging requirements, and other parameters.

Figure 5:
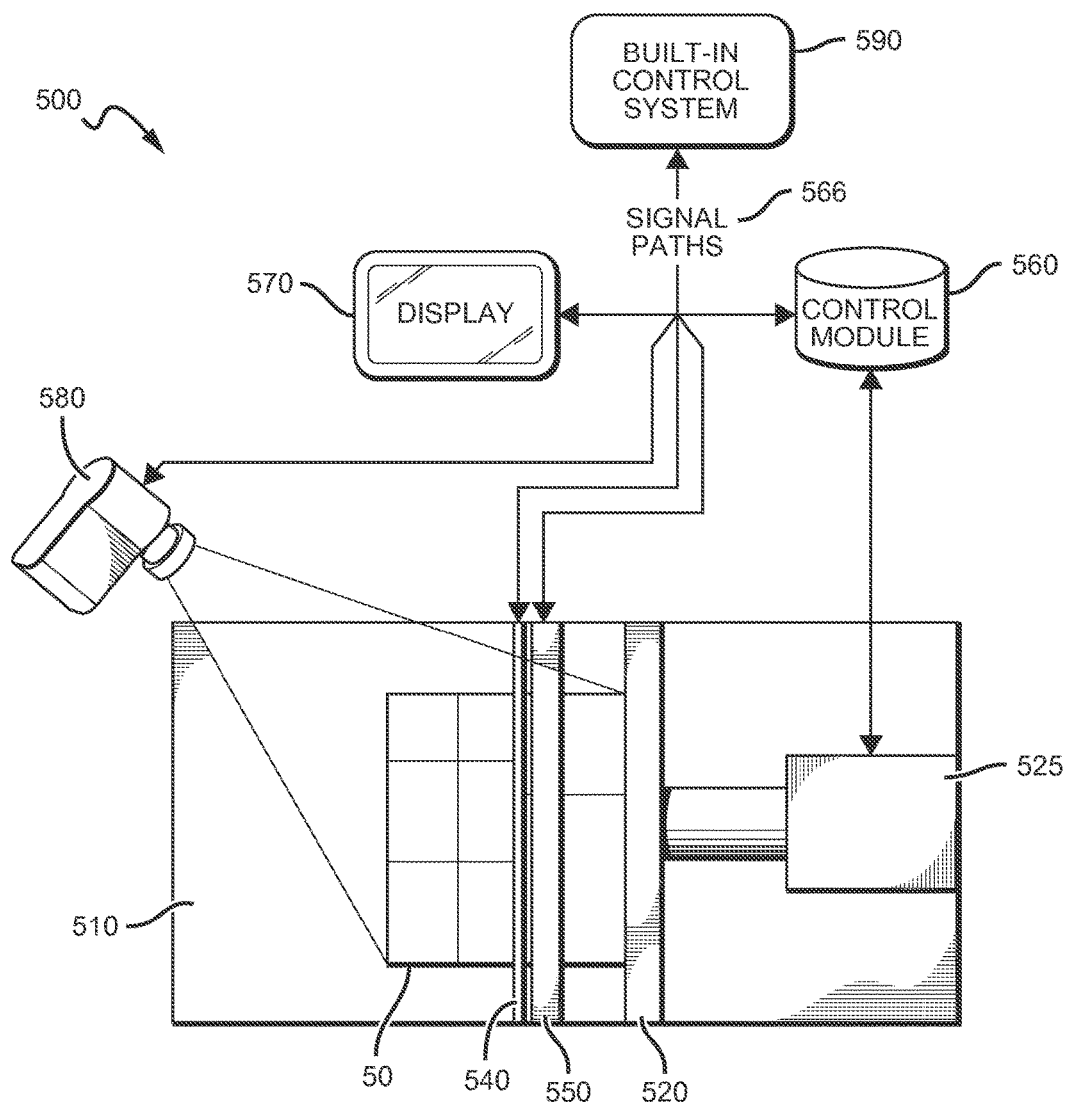
FIG. 5 is a schematic representation of a top view of cutting machine 500 that shows signals from the control module going to the display, camera, cutter, press member, and/or actuator via the built-in control system's signal paths.

FIG. 5 is a schematic representation of cutting machine 500, which features a built-in control system. Built-in control system 565 controls at least the backgauge 520, actuator 525, press member 550, cutter 540, and table air. The Built-in control system may also store pre-programmed cut courses, i.e., for a given cut course, the position of backgauge 520 with respect to cutter 540 is programmed for each step. To adapt cutting machine 500 to the improved cut courses, control module 560 controls the position of backgauge 520, cutter 540, and other components by sending signals through the built-in signal paths 566. In one embodiment, control signals are sent via the machine's keyboard signal path, i.e., "spoofing" keyboard input. Advantageously, this allows clients to use their existing cutting machines to implement more efficient cut courses without needing to replace the operational controls, motors/drives etc. in the client's cutting machine. Moreover, the control module can operate in a mode that allows the cutting machine to be operated using the built-in controls, as if the control module were not installed in the machine.

Figure 6:
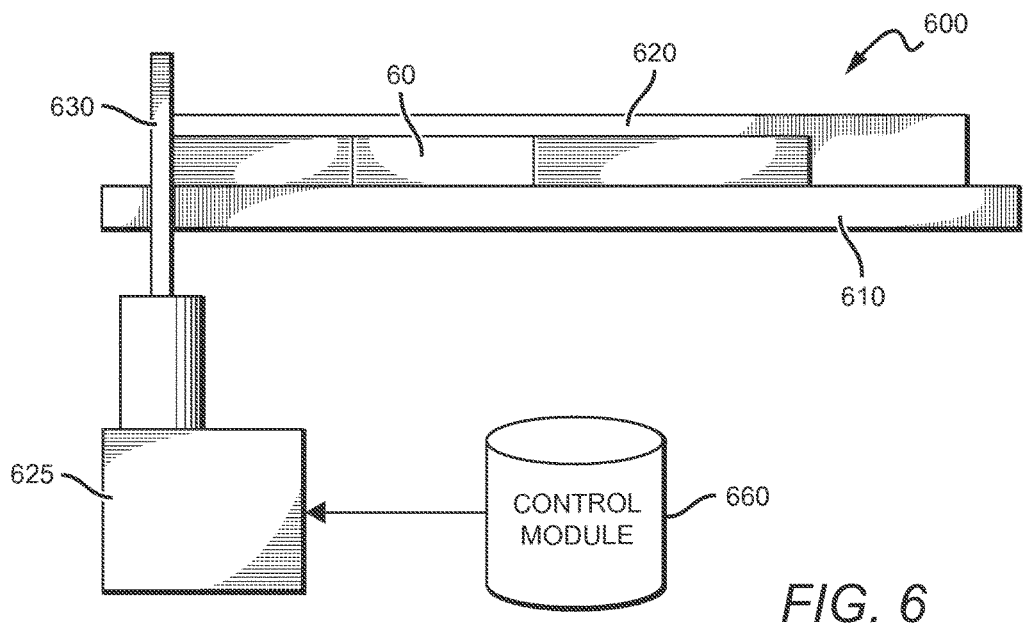
FIG. 6 is a schematic representation of cutting machine 500 and shows the control module coupled with a second actuator 625 that raises and lowers sidewall 630.

FIG. 6 shows a side view of cutting machine 600. Control module 660 is coupled with second actuator 625 that moves side wall 630 up and down. Thus the inventors contemplate that cutter 600 can include a sidewall, which can optionally be used to align the lift and or logs. The sidewall can also be used in conjunction with the backgauge to square the lift/logs during a jogging step to make sure each printed sheet is aligned before the next cut. When it is not in use, sidewall 630 can be lowered so that is flush with (or below) the top surface of the table.

Figure 7:
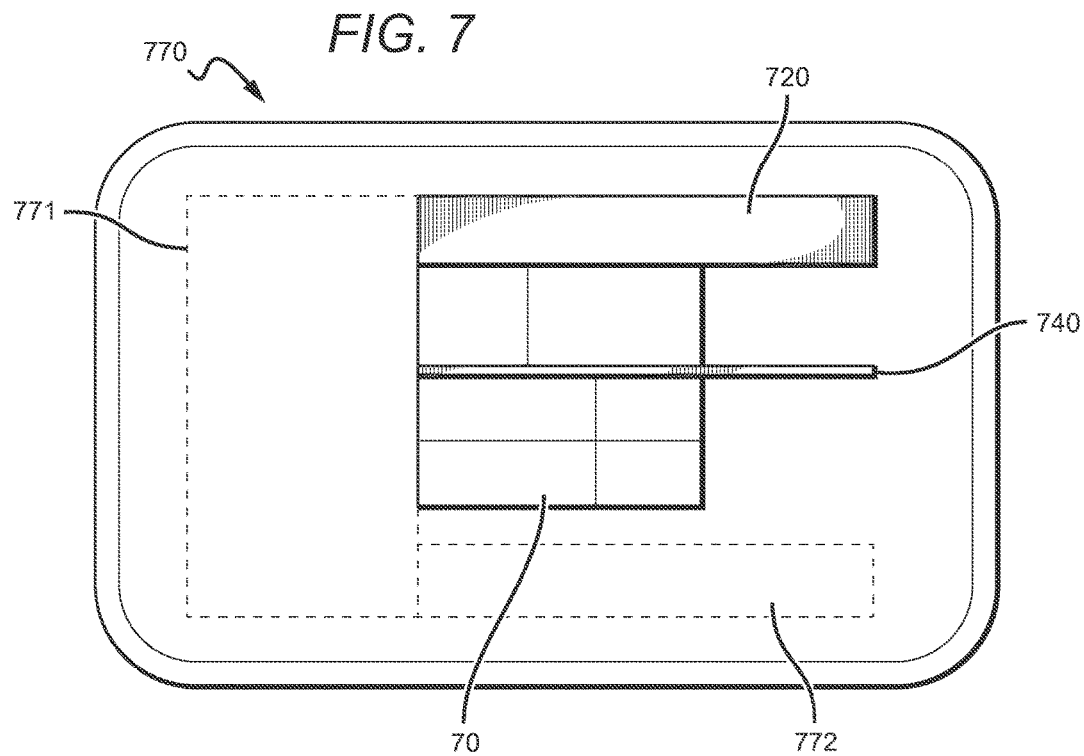
FIG. 7 is an illustration of display 770 and lift schematic 70.

FIG. 7 shows a schematic representation of one embodiment of display, 770. Display 770 shows lift schematic 70 positioned against backgauge 720 for the next cut. Cutter 740 illustrates where the next cut will be made to the lift. To the left of lift schematic 70, a holding area, called the "logs desk" 771 is shown as empty and ready to receive logs cut from the lift. A space for finished items, the "finished products desk" 772 is illustrated below. The display is a touch screen that the operator can touch to replay the animation of how to position and orient the lift and/or logs.

Figure 8:
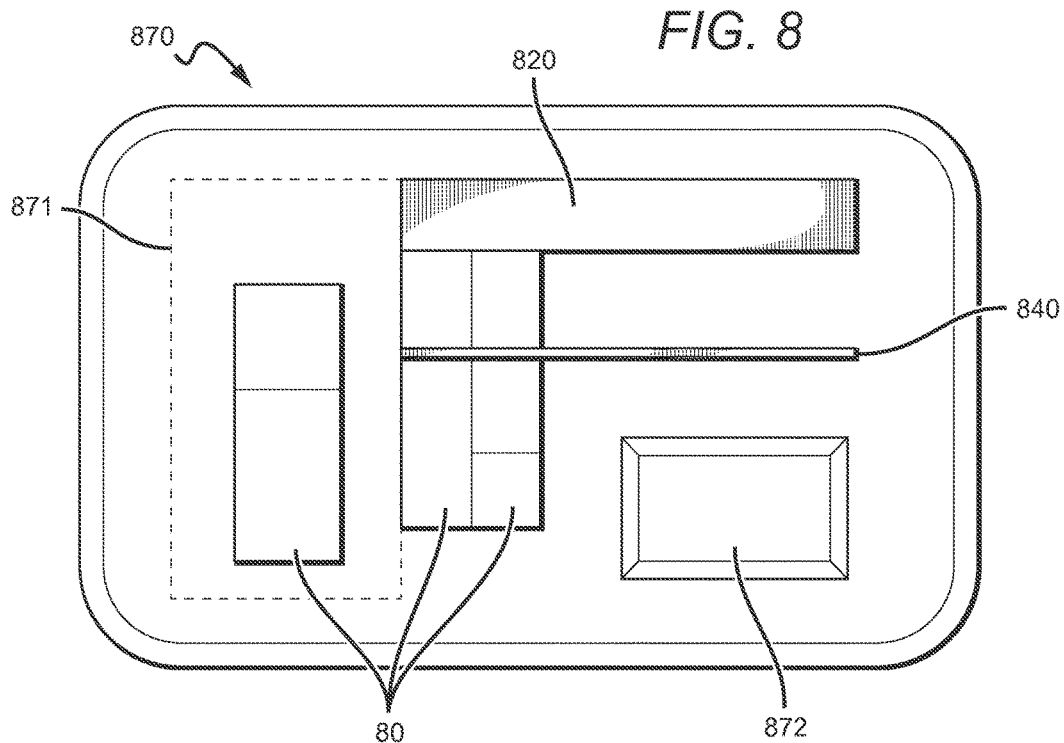
FIG. 8 is an illustration of display 870, which shows logs desk 871, backgauge 820, cutter 840, logs 80, and a notification 872.

FIG. 8 shows a schematic representation of how display 870 instructs a worker to cut two logs concurrently. Schematic representations of two logs 80 are positioned against backgauge 820 and cutter 840 shows where cuts will be made in the two logs perpendicular to the cuts used to make the logs. To the left, a log is shown on logs desk 871. Notifications can be transmitted to the operator by a variety of means, voice commands, text prompts. In FIG. 8, notification 872 is shown as a popup window, button that the worker can touch to access further information/instructions. For example, one notification instructs the operator the change the cutting blade. Another notification instructs the operator how to package finished products. The appearance of products in the finished products desk could also serve as an instruction to package the products. Yet another notification may instruct the operator how many products to discard, i.e., to discard any products in excess of the order.

Figure 9:
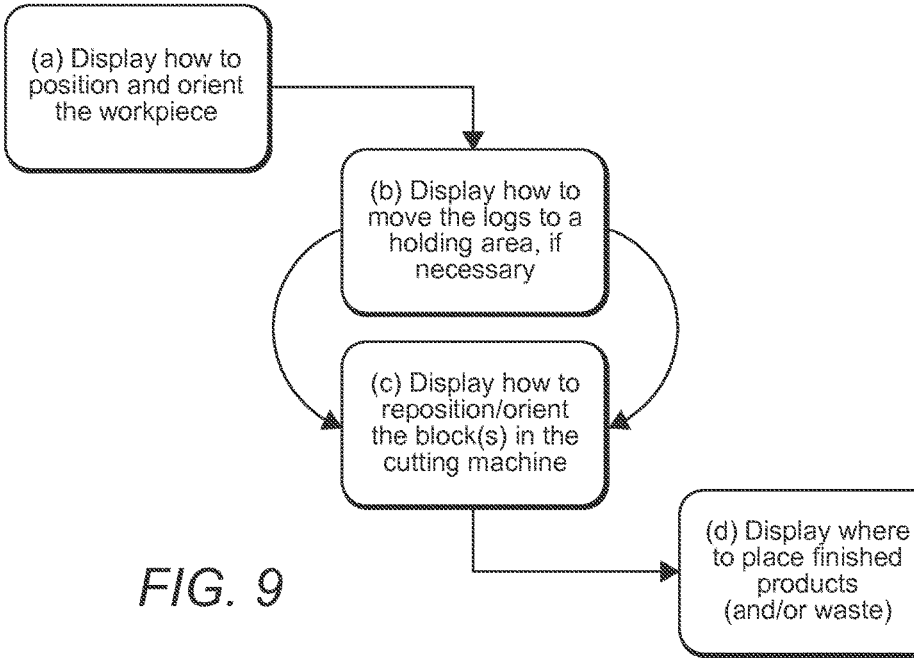
FIG. 9 shows a flow diagram of an exemplary method of instructing an operator to use a cutting machine to cut a lift into a set of products.

FIG. 9 shows a flow diagram of steps in a contemplated method of instructing an operator to use a cutting machine to cut a lift into a set of products. First the display shows (a) how to position and orient the lift. If necessary, the display illustrates (b) how to move the logs to a holding area. Then, the display depicts (c) how to position and orient the log(s) in the cutting machine for the next cut. If a cut yields a finished product or waste, then the display (d) shows the operator where to place the finished products/waste. Steps (b), (c), and (d) are repeated until the all the finished products have been produced from the lift.

Figure 10:
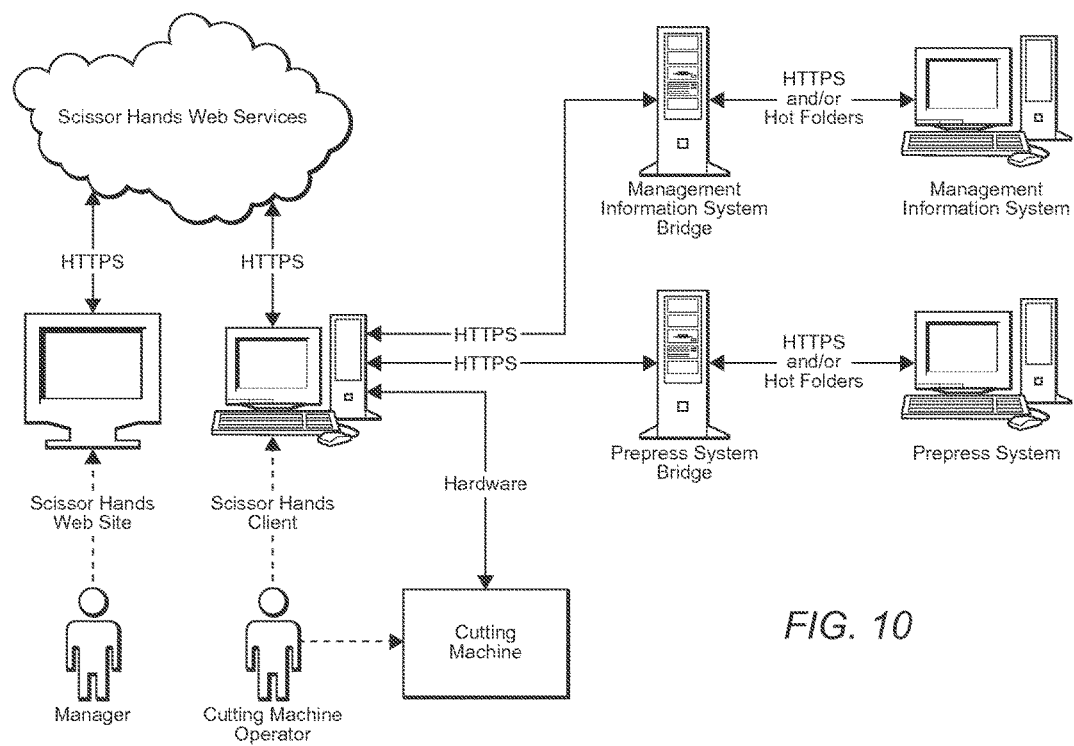
FIG. 10 shows a flow diagram of an exemplary cutting machine system.

An exemplary system according to the inventive subject matter is shown in FIG. 10. Scissorhands Client handles operations between MIS, Prepress System, Scissorhands Cloud Service and the Cutting Machine. Scissorhands Client accesses information about cutting jobs stored locally or on a MIS or other Prepress System through connections (e.g., HTTPS or Hot Folders). Next, Scissorhands Client sends position and size data for the products on a sheet (e.g., in CIP4 Job Description Format) to the Scissorhands Cloud Service. Scissorhands Cloud Service analyzes the job to determine the most efficient way to cut the job (e.g., on a guillotine cutter) and generates a cut course.

Typically, Scissorhands Web Service receives information about the printed sheets, analyzes the positions of the products, and prepares efficient cut courses. To generate efficient cut courses the Scissorhands Cloud Service accounts for how many seconds each operation generally takes (e.g., moving the backgauge, placing a new lift on the cutting table, rotating the sheet, etc.), the type and thickness of the paper used in the job, how slippery or wavy the sheet is and physical dimensions of the cutter table. Additionally, each customer can create a Scissorhands Web Service profile via a web browser. The customer can set up preferences regarding, for example, types of machines, physical dimensions, and other cutting options. With all of this information, Scissorhands Web Service proposes how many lifts the jobs should have, how many lifts/logs to place on the table at the same time, and what actions the operator should take in what order to achieve the best possible result (i.e., a cut course having efficiency superior to those produced by other methods/processes).

When the Scissorhands Client receives the cut course from the Scissorhands Web Services, the operator can select any job using the Scissorhands Client (e.g., by scanning a barcode on the sheet or selecting job manually from a list). Next, Scissorhands Client directs the hardware interface to designate Schissorhand Client as the source of data going to the attached Cutting Machine. With the Scissorhands Client thus connected, the cut course can be sent from the Scissorhands Client to the Cutting Machine.

In executing the cut course, the display shows the operator step-by-step instructions. These instructions show how the printed sheets actually look, how the lift/logs should be placed to the cutter, where the cut is going to be executed, and what buttons operator should press next if applicable. In a preferred embodiment, the Scissorhands Client shows an animation of how the lift/logs should be rotated, what logs should be stored for later processing, and what the operator should see on the cutter table at any given moment.

While a job is in progress, Scissorhands Client monitors and captures data from the cutting machine, using that data to coordinate the cutting sequence and to allow small operator corrections. Monitoring functions determine when an action, such as blade drop or back gauge movement, has occurred, so that the Scissorhands Client can coordinate those actions. The hardware interface switches between monitoring and upload modes numerous times during a cut course. Scissorhands Client can also inform a connected MIS of numerous aspects of job status (e.g., report that a job is started or finished, which operator is completing the job, which cutter is being used, and other information).

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects, including efficiently making multiple linear cuts to a stack of paper (or other lift) to produce multiple products of differing dimensions.

The discussion herein provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A cutting machine that assists an operator in making successive cuts on a lift of sheets, according to a cut course or other pattern, the cutting machine comprising:
    a table, a backgauge, and a cutting blade or other cutter;
    a press member configured to press the lift against the table while the lift is being cut by the cutter;
    a processor configured to:
        receive position information for products printed on the log;
        analyze the position information;
        generate a cut course; and
    a control module configured to:
        operate an actuator that positions the backgauge with respect to the cutter for successive at least first and second cuts;
        instruct the operator (i) where to position and how to orient the lift with respect to the backgauge for the first cut, (ii) where to temporarily place a first cut lift, and a first log resulting from the first cut, with respect to a holding area, a cutting area, and a finished area, and (iii) where to reposition and how to orient at least one of the cut lift and the first log with respect to the backgauge for the second cut;
        wherein the lift becomes successively smaller by cutting away the first log with the first cut, and a second log with the second cut.

2. The cutting machine of claim 1 further comprising a display that shows the operator where to position and how to orient the first and second logs with respect to the backgauge for a third cut.

3. The cutting machine of claim 1 further comprising a camera that captures an image of the lift, and wherein the display uses at least a portion of the image to show the operator how the lift is positioned with respect to at least one of the backgauge and the blade.

4. The cutting machine of claim 1, further comprising an interface configured to receive information about the cut course via a software as a service portal.

5. The cutting machine of claim 1, wherein the processor is configured to generate the cut course locally, on demand.

6. The cutting machine of claim 1 wherein the control module is further configured to control at least one of table angle, table air, pile push-out, and press member pressure.

7. The cutting machine of claim 1 wherein the control module is further configured to control a second actuator disposed to at least one of: actuate a side wall, remove a scrap, and tilt the backgauge.

8. The cutting machine of claim 1 wherein the control module is further configured to integrate with a management information system.

9. The cutting machine of claim 1, further comprising a built-in control system, and the control module is further configured to integrate with the built-in control system.

10. The cutting machine of claim 1 wherein the control module is further configured to make service recommendations.

11. The cutting machine of claim 1, further comprising a sensor that identifies at least of position and orientation of the lift with respect to the backgauge, and an interface that provides feedback to the operator if the lift is improperly positioned.

12. The cutting machine of claim 1, wherein the step of generating the cut course comprises accounting for how much time is generally required for each of several operations.

13. The cutting machine of claim 2 wherein the display is further configured to use a schematic of at least a portion of the lift to show the operator how the lift is positioned with respect to at least one of the backgauge and the blade.

14. The cutting machine of claim 2 wherein the display is further configured to show the operator how to re-position the first log against the backgauge to make the third cut.

15. The cutting machine of claim 2, wherein the display is further configured to show the operator how to re-position the first and second logs against the backgauge to concurrently make the third cut in both the first and second logs.

16. The cutting machine of claim 5, wherein the processor is further configured to dynamically modify the cut course.

17. The cutting machine of claim 9 wherein the control module integrates with the built-in control system by inserting a command signal in a signal path of the built-in control system.

18. The cutting machine of claim 12, wherein the several operations include at least one of moving the backgauge, placing a new lift on the cutting table, and rotating the new lift.

19. The cutting machine of claim 12, wherein the step of generating the cut course further comprises accounting for the type and thickness of the paper used in the job.

20. A method of instructing an operator to use a cutting machine to cut a lift into a set of products, comprising:
    using a processor to generate a cut course comprising a plurality of successive cuts, by analyzing positions of products printed on the lift;
    providing simulations to the operator that depict:
        how to orient the lift with respect to the cutting machine to make the plurality of successive cuts to produce a plurality of cut-away logs; and where to place each of the plurality of cut-away logs with respect to a holding area, a cutting area, and a finished area; and using a display to depict real-time or near real-time positioning of (a) the lift and the cut-away logs with respect to the cutting machine, and (b) the cut-away logs with respect to the holding area.

21. The method of claim 20 further comprising using at least one of the simulations to show the operator how to reinsert at least two of the cut-away logs into the cutting machine for concurrent cutting.

22. The method of claim 20 further comprising using at least one of the simulations to show the operator how to cut a stack of at least two of the cut-away logs.

23. The method of claim 20 further comprising providing feedback to the operator with respect to whether the operator is properly operating the cutting machine in accordance at least one of the simulations.

24. The method of claim 20 further comprising notifying the operator of a modification to the simulation that increases the accuracy of the next cut, wherein the modification accounts for humidity.

25. The method of claim 20 further comprising providing a packaging recommendation to a packager with respect to the set of products.

* * * * *